United States Patent [19]

Edgar et al.

[11] Patent Number: 5,360,843
[45] Date of Patent: Nov. 1, 1994

[54] CELLULOSE ACETOACETATES

[75] Inventors: Kevin J. Edgar; William W. Blount, Jr., both of Kingsport, Tenn.

[73] Assignee: Eastman Chemical Company, Kingsport, Tenn.

[21] Appl. No.: 160,989

[22] Filed: Dec. 2, 1993

Related U.S. Application Data

[60] Division of Ser. No. 109,205, Aug. 19, 1993, Pat. No. 5,292,877, which is a continuation of Ser. No. 742,821, Aug. 9, 1991, abandoned.

[51] Int. Cl.$^5$ .............. C08L 1/12; C09J 4/00;
 C09J 101/00; B05D 3/02
[52] U.S. Cl. .............. 524/41; 524/43;
 524/45; 524/55; 106/176; 106/186; 106/196;
 106/197.1; 106/197.2; 106/203; 106/204;
 106/205; 106/208; 106/209; 427/384;
 427/388.1; 427/388.2; 427/391; 427/393.5
[58] Field of Search ............... 524/41, 43, 45, 55;
 106/176, 186, 196, 197.1, 197.2, 203, 204, 205,
 208, 209; 427/384, 388.1, 388.2, 391, 393.5

[56] References Cited

U.S. PATENT DOCUMENTS

| | | | |
|---|---|---|---|
| 2,103,505 | 12/1937 | Wiezevich et al. | 526/316 |
| 2,500,029 | 3/1950 | Hagemeyer | 536/56 |
| 2,521,897 | 9/1950 | Caldwell | 536/56 |
| 3,345,313 | 10/1967 | Ruhf et al. | 524/601 |
| 3,347,951 | 10/1967 | Vasta | 525/119 |
| 4,278,790 | 7/1981 | McCormick | 536/84 |
| 4,302,252 | 11/1981 | Turbak et al. | 106/163 |
| 4,698,391 | 10/1987 | Yacobucci et al. | 525/162 |
| 4,737,551 | 4/1988 | Dervan et al. | 525/440 |
| 4,981,959 | 1/1991 | Diamantoglou | 536/69 |
| 4,981,960 | 1/1991 | Diamantoglou | 536/69 |
| 4,997,935 | 3/1991 | Diamantoglou | 536/69 |
| 5,008,385 | 4/1991 | Diamantoglou | 536/69 |

FOREIGN PATENT DOCUMENTS 1016249 9/1957 Germany.
2172891 10/1986 United Kingdom.

OTHER PUBLICATIONS

*Macromol. Chem.*, 1953, 10, 261–279.
*Polymer*, 1987, 28, 2317–2323.
*Das Papier*, 42, No. 12, pp. 690–694 (1988).
*Tet. Lett.*, 1990, J. S. Witzeman, 31, 1401–1404.
*Rev. Macromol. Chem. Phys.*, 1990, C30, 405–439.

*Primary Examiner*—Nathan M. Nutter
*Attorney, Agent, or Firm*—Betty J. Boshears; Harry J. Gwinnell

[57] ABSTRACT

Water soluble cellulose acetoacetates prepared by contacting a cellulose material with diketene, an alkyl acetoacetate, 2,2,6-trimethyl-4H-1,3-dioxin-4-one or a mixture thereof in a solvent system comprising lithium chloride plus a carboxamide. Compositions containing the cellulose acetoacetates and, optionally, a crosslinking agent are useful for coatings applications.

18 Claims, No Drawings

CELLULOSE ACETOACETATES

This is a request for filling a divisional application under 37 CFR 1.60 of pending prior application Ser. No. 08/109,205 filed on Aug. 19, 1993 and now U.S. Pat. No. 5,272,877, of Kevin J. Edgar and William W. Blount for "CELLULOSE ACETOACETATES". Ser. No. 08/109,205 is a file Wrapper continuation of Ser. No. 07/742,821 filed on Aug. 9, 1991, now abandoned.

FIELD OF INVENTION

This invention concerns novel cellulose acetoacetates ("CAA"s) including some that are water soluble, as well as a process for production thereof and coating compositions prepared therefrom.

BACKGROUND OF THE INVENTION

Acetoacetylated polymers are of intense current interest. Incorporation of acetoacetate groups into polymers generally affords several benefits, including reduction of solution viscosity (valuable in coatings applications) and introduction of a handle (the acetoacetate group) for ready polymer crosslinking. The crosslinking chemistry of the acetoacetate group is rich and growing. These attributes make acetoacetylated polymers of particular interest in thermoset coatings applications.

Polymers with affinity for water are also currently of great interest. Water-soluble polymers can be used to change the rheology of aqueous solutions, and so find many industrial applications, for example in the food industry as thickeners, in the oilfield industry as suspension aids, in the pharmaceutical industry as excipients, and in the coatings industry as film formers.

Cellulose is a readily available, naturally occurring polymer, whose derivatives are highly valued in coatings applications as well as the other industrial applications cited above. It is clear, therefore, that the ability to efficiently acetoacetylate cellulose might afford products of commercial interest. In particular, if water-soluble products could be made in this way, materials of great interest in industry might result.

There is relatively little literature on the acetoacetylation of cellulose. P. J. Wiezevich and A. H. Gleason (U.S. Pat. No. 2,103,505, 1937) taught a method of acetoacetylation with diketene (which they incorrectly called "cyclobutane 1,3-dione") which they applied to cotton linters in one of their examples. They claimed cellulose acetoacetate by reaction of diketene with cotton linters employing "an acid esterification catalyst", but gave no supporting details about either the method or the product.

H. Staudinger and T. Eicher (*Makromol. Chem.*, 1953, 10, 261–279) teach complete acetoacetylation of cellulose employing a heterogeneous system of regenerated cellulose in acetic acid with sodium acetate catalyst, and diketene as acetoacetylating reagent. They obtained a product with a degree of substitution ("DS") per anhydroglucose unit ("AGU") of 3.0, as measured by elemental analysis. The product was soluble in acetic acid and acetone, and insoluble in water.

V. H. Reblin expanded upon these results (*Chimia*, 1968, 22, 230–233). He treated cotton with diketene, according to the method of Staudinger and Eicher. This gave a partially acetoacetylated cotton, still water insoluble, which was subjected to crosslinking with aliphatic diamines. Reblin found that the crosslinking gave bis-(enamine) linkages, and dramatically decreased the tensile strength of the cotton. The crosslinks could be hydrolyzed with dilute acids.

None of these prior art teachings allow direct, homogeneous acetoacetylation of cellulose to the desired DS. None of them give evidence of preparing a homogeneously substituted CAA with DS/AGU less than 3.0. Nothing known in the prior art teaches preparation of a water-soluble cellulose acetoacetate. Nothing known in the prior art teaches acetoacetylation of cellulose in the absence of acid or base catalysis.

Most of the known cellulose solvents are unsuitable for reactions in which cellulosic hydroxyls serve as nucleophiles. The solvent system recently introduced by C. L. McCormick (U.S. Pat. No. 4,278,790, 1981) and A. F. Turbak, A. El-Kafrawy, F. W. Snyder, Jr., and A. B. Auerbach (U.S. Pat. No. 4,302,252, 1981) are exceptions in that they do permit certain such reactions. McCormick and Turbak et al. have taught that cellulose may be dissolved in solutions of lithium chloride in either N,N-dimethylacetamide or 1-methyl-2-pyrrolidinone. McCormick has further taught (U.S. Pat. No. 4,278,790; Polymer, 1987, 28, 2317–2323) that electrophilic reagents may be added to these cellulose solutions to derivatize cellulose. McCormick has prepared cellulose acetate, methyl cellulose, cellulose carbamate, and other derivatives (but not CAA) in this way.

There is, therefore, a need for a process by which CAA of the desired degree of substitution may be prepared directly from cellulose. It is desirable that cellulose be reacted in solution, to assure homogeneous substitution along the polymer chains. The process should be economical and amenable to scale up to industrial production. It would be desirable to have available from this process a CAA of the correct composition, such that it would have good solubility in water.

SUMMARY OF THE INVENTION

The present invention is directed to a synthesis process for preparing cellulose acetoacetate, said process comprising contacting in any order the following:
  (i) a cellulose material,
  (ii) diketene, an alkyl acetoacetate, 2,2,6-trimethyl-4H-1,3-dioxin-4-one, or a mixture thereof,
  (iii) a solubilizing amount of a solvent system comprising lithium chloride plus a carboxamide selected from the group consisting of 1-methyl-2-pyrrolidinone, N,N-dimethylacetamide, or a mixture thereof, and
  (iv) optionally, a catalytic amount of pyridine, NaOAc, $Et_3N$, amine, mineral acid, or alkali or alkaline earth metal salt under conditions to promote formation of the desired cellulose acetoacetate. After the desired product is formed it is generally desirable to perform the optional additional step of insolubilizing the CAA by addition of an insolubilizing amount of a nonsolvent.

The present invention is also directed to cellulose acetoacetates having a DS/AGU of 0.1 to about 2.9. Preferably the novel, water-soluble cellulose acetoacetates have a DS/AGU of about 0.4 to about 1.1, more preferably about 0.8 to about 1.0.

The present invention is also directed to a coating composition comprising:
  (A) about 0.5 to about 50 percent, based on the weight of the total coating composition, of a water soluble cellulose acetoacetate, (B) about 25 to about 95 percent, based on the weight of the total coating composition, of water, and (C) about 0 to about 40 percent, based on the weight of the cellulose acetoacetate, of a crosslinking agent.

The present invention is further directed to a process for preparing a coated substrate comprising contacting said substrate with a coating composition comprising:

(A) about 0.5 to about 50 percent, based on the weight of the total coating composition, of water soluble cellulose acetoacetate, (B) about 25 to about 95 percent, based on the weight of the total coating composition, of water, and (C) about 0 to about 40 percent, based on the weight of the cellulose acetoacetate, of a crosslinking agent, followed by removing water and thermal curing. Additionally, the present invention includes a coated substrate comprising a substrate having coated thereon a cured water soluble cellulose acetoacetate.

DETAILED DESCRIPTION OF THE INVENTION

The unique ability of certain of the acetoacetylated cellulose polymers of the invention to be completely solubilized by water makes them useful in low VOC (volatile organic content) coatings. Low VOC is becoming increasingly desirable because of environmental and regulatory considerations.

By the term "water soluble" and derivative terms thereof it is meant that upon contacting the cellulose acetoacetate with an excess of water (a solubilizing amount) at 25° C., and optionally mixing, the cellulose acetoacetate becomes solubilized or dissolved, without the need for additional cosolvents or dispersing aids, at a level of at least 10 wt. percent, preferably at least 20 wt. percent.

The practice of the current invention allows for a wide variety of cellulose starting materials, temperatures, concentrations, nonsolvents, and reactant ratios. A wide variety of CAA's may be produced, depending on the conditions selected.

The cellulose acetoacetates of the invention have the desired DS/AGU and comprise repeating units of the structure:

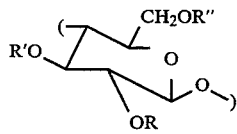

wherein R, R', and R" are selected separately from the group consisting of: hydrogen and acetoacetyl.

The CAA's of the invention typically have an intrinsic viscosity (IV) as measured in dimethyl-sulfoxide (DMSO) at a concentration of 0.25 g polymer/100 ml solvent at 25° C. of about 0.05 to about 3.5, preferably about 0.2 to about 1.0. The weight average molecular weight (Mw) as measured by gel permeation chromatography in 1-methyl-2-pyrrolidinone using polystyrene standards is typically about 40,000 to about 1,000,000.

A wide variety of celluloses may be used for the process of the invention. It should be especially noted that the crystal structure of the cellulose starting material is irrelevant, since it will be destroyed when the cellulose is dissolved. This permits use of cellulose from low-price sources, which are not as useful in conventional heterogeneous cellulose reactions. The cellulose sources useful in our invention include hardwoods, softwoods, bacterial and microcrystalline cellulose.

The solvent system useful herein and as taught by McCormick must include lithium chloride plus a carboxamide. The carboxamide may be 1-methyl-2-pyrrolidinone, N,N-dimethylacetamide, or a mixture thereof. The ratios of carboxamide/cellulose and LiCl/cellulose may vary within a moderately wide range.

The acetoacetylating reagent may be either diketene, 2,2,6-trimethyl-4H-1,3-dioxin-4-one, or an alkyl acetoacetate wherein the alkyl group is straight chain or branched and has 1 to 18 carbon atoms. As taught by J. S. Witzeman (*Tet. Lett.*, 1990, 31, 1401–1404), tert-butyl acetoacetate is an especially suitable alkyl acetoacetate because it generates the reactive intermediate, acetylketene, at a high rate.

Catalysts are not necessary if the process of the current invention is carried out in the temperature range of 80°–160° C. as described below. Catalysts may be used to permit use of lower temperatures in the process. Such catalysts include (but are not limited to) amines (including pyridine, alkylpyridines, triethylamine, and 4-dimethylaminopyridine), mineral acids (including sulfuric acid and hydrochloric acid) and alkali or alkaline earth metal salts (including sodium acetate, lithium chloride).

In the synthesis process of the invention the molar ratio of component (i):component (ii) is that amount that will result in the desired DS/AGU under the chosen reaction conditions. This mole ratio of component (i):component (ii) is typically about 1:1 to about 1:5. The amount of component (i) is typically about 0.1 percent to about 8 percent, preferably about 3 percent to about 5 percent, based on the weight of the carboxamide. The amount of lithium chloride is typically about 100 percent to about 300 percent, preferably about 150 percent to about 250 percent, based on the weight of component (i).

Conditions suitable for the formation of CAA's can vary widely. The temperature for contacting the cellulose material (i.e., component (i)) with the acetoacetylating reagent (i.e., component (ii)) in the solvent system can vary between 80°–160° C., with 100°–120° C. most preferred, except in the case where a catalyst is used. When a catalyst is present, the temperature can range from −30°–160° C., with 10°–100° C. preferred and 15°–80° C. most preferred. The addition time (contact time) can vary from 0.1–10 hours, with 1–2 hours most preferred. After the contact or addition time it is often desirable to further extend the total reaction period by holding the contacted components for a hold time at a certain hold temperature. The hold temperature after addition (i.e., after all of components (i), (ii) and (iii) have been contacted) can vary from 80°–160° C. −30°–160° C. in the catalyzed process) at a hold time of 0 to about 10 hours, preferably about 0.5 to about 10 hours. Hold time and temperature can be used to adjust the molecular weight of the final product in the uncatalyzed process, and in some cases its solubility. Higher temperatures lead to lower molecular weights. For high molecular weight products, temperatures of 100°–120° C. are preferred. For low molecular weight products, temperatures of 140°–160° C. are preferred. Those of skill in the art readily recognize that reaction times and reaction temperatures employed are interdependent and thus can vary considerably.

The yield of CAA in the process of the invention is at least about 80 percent, preferably at least about 98 percent, said percentages being based on the theoretical maximum yield of CAA.

Nonsolvents to be used in the isolation of the CAA can be any solvent in which the reaction solvents and by-products are miscible, but in which the CAA is insoluble. Preferred nonsolvents include methanol, ethanol, isopropyl alcohol, and acetone. An insolubilizing amount of nonsolvent is generally at least about 900 percent, based on weight of nonsolvent per weight cellulose used. After insolubilizing the CAA with nonsolvent, it is typically desired to perform the additional optional step of separating the CAA from the nonsolvent, e.g., by filtration, drying, decantation, washing, and the like, to result in substantially pure CAA.

The class of CAA prepared as taught herein and having the desirable property of being dissolved or dispersed in water without the need of added organic cosolvents or other dispersing aids can be formulated into crosslinkable coatings. Fully formulated, pigmented and catalyzed, water-borne CAA enamels are prepared by first adjusting the viscosity of a CAA/Water solution to a Gardner-Holdt viscosity of Z1–Z3 (1000 to 3000 cP) then mechanically dispersing a pigment, such as rutile titanium dioxide, until the desired fineness-of-dispersion is obtained.

Crosslinking resins, catalysts, rheological additives, anti-settling agents, tinting pigments, flexibilizing plasticizers and the like can be added to the CAA/Water/pigment dispersion as needed during a final letdown to application viscosity. Of course, final viscosity requirements will vary with application and will be about 100 cP for air-atomized spraying to about 1000 cP for roller coating operations. Other procedures such as masterbatch preparation and the use of pre-dispersed pigments would also be acceptable.

The coatings test procedures used in the description and examples of this invention are as follows:

1. Testing Coated Metal Specimens at 100 Percent Relative Humidity-Cleveland humidity (ASTM Method D 2247)
2. Gardner-Holdt Bubble Viscosity (ASTM Method D 1545)
3. Film Thickness (General Electric Gage, Type B)
4. Film Hardness (Pencil Method)
5. Solvent resistance (methylethyl ketone (MEK) dynamic rub test) (see ASTM Method D 1308)
6. Staining Tests (ASTM Method D 1540)
7. Specular Gloss (ASTM Method D 523)
8. Hegmann Fineness-of-Dispersion (ASTM Method D 1210)

As appreciated in the art, the exact components and properties of components desired for any given coating application can vary, and therefore, routine experimentation may be required to determine the optional components and proportions of components for a given application and desired properties.

Preferred crosslinking agents contain substituted melamine and urea resins or residues such as hexamethoxymethylmelamine, hexabutoxymethylmelamine, tetramethoxymethylurea, or tetrapropoxymethylurea. Other useful crosslinking materials are amine terminated polyamides, polyoxyethylenes, polyoxypropylenes and the like. Particularly useful are an amino resin offered by American Cyanamid, CYMEL 303, and a polyamine available from Texaco, JEFFAMINE D230. The coating composition of the mixture preferably contains at least 0.1 percent crosslinking agent (component (C)), preferably about 1 percent to about 35 percent crosslinking agent (component (C)), and more preferably about 2 to about 25 percent, said percentages being based on the weight of the CAA. It is particularly preferred that the cross-linking agent is a melamine resin, a urea resin, an amino resin, or a mixture thereof and is present in an amount of about 0.5 to about 40 percent, based on the weight of the CAA. In the coating composition a preferred amount of component (A) is about 2.5 to about 30 percent, more preferred is about 5 to about 25 percent; and a preferred amount of component (B) is about 30 to about 80 percent, more preferred is about 40 to about 60 percent, said percentages being based on the total weight of the coating composition.

The coating composition optionally contains up to about 70 weight percent based on the weight of coating binder, that is component (A) plus component (C), of one or more additional coating additives.

A preferred amount of coating additives is about 1 to about 30 percent. Examples of such coating additives include flow control additives such as silicones, fluorocarbons, or cellulosics; coalescing solvents such as diethylene glycol monobutyl ether, trimethylpentanediol monoisobutyrate, or ethylene glycol monooctyl ether; strong acid catalysts such as p-toluenesulfonic acid, trichloroacetic acid, or trifluoromethanesulfonic acid; pigments such as titanium dioxide, barytes, clay, or calcium carbonate; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum and the like.

The Gardner-Holdt viscosity of the coating composition is preferably about T to about Z3; more preferably about W to about Z1. These viscosity values permit application by spraying and/or wire-rod drawdowns (which simulate a roller coating operation) as practiced in Examples 6–9 hereof.

The coating composition can be prepared by the techniques described herein and/or by techniques known in the art, e.g., as disclosed in U.S. Pat. Nos. 4,698,391, 4,737,551, and 3,345,313, the disclosures of which are incorporated herein by reference in their entirety.

The coating composition can be applied onto a substrate and crosslinked using techniques known in the art; e.g., by spray-applying 3 to 4 mils of wet coating and baking in a 150° C. forced air oven for 30 minutes, by similarly preparing and baking at a lower temperature of 60° C. for one hour, or in some cases by curing at ambient temperature for 2 to 24 hours.

The substrate can be any common substrate such as paper, polymer films such as polyethylene or polypropylene, metals such as aluminum, steel, galvanized steel, glass, urethane elastomers, primed (painted) substrates, and the like.

After the coating composition is coated onto a substrate and cured (i.e., crosslinked) such a cured coating has many desirable properties such as good pencil hardness, good gloss, good humidity resistance, and good MEK double rub solvent resistance.

Preferred pencil hardness (mar/cut) is about B to about 4H; more preferred is at least F; preferred gloss at 60° C. is about 40 percent to about 100 percent, more preferred is above 60 percent; preferred solvent rub resistance is at least about 200, more preferred is at least about 250; preferred humidity resistance (100 hours at 60° C.) is about 70 to about 100 gloss retention, more preferred is about 88-100 percent gloss retention.

EXAMPLES

In the following examples, the cellulose and carboxamide solvent used were loaded into a 500 mL, three-necked round bottom flask equipped with mechanical stirrer, thermometer, nitrogen inlet, and reflux condenser. The slurry was heated to 100° C. under nitrogen, then the amount of LiCl used was added all at once. The slurry was heated to 150° C., then the heat was removed and the mixture was allowed to cool slowly to room temperature. The cellulose dissolved during the cooling period, usually within 3 hours of the time when the heat was removed. The straw-colored, highly viscoelastic solution was heated to the addition temperature, at which point the indicated amount of the indicated acetoacetylation reagent was added over the indicated time period. The resulting solution was held at the addition temperature for the indicated hold time, then was cooled to room temperature. The product was isolated by precipitation with methanol and purified by washing with methanol. The product was dried for analysis at 40°-60° C. under vacuum. The results in the examples indicate yields of isolated, well-characterized products. The products typically were characterized by intrinsic viscosity, gel permeation chromatography (1-methyl-2-pyrrolidinone solvent, polystyrene reference standard), infrared spectroscopy, $^1$H and $^{13}$C NMR spectroscopy, and other methods familiar to one well versed in the art. The degree of substitution was determined by digestion with n-butyl alcohol at reflux, followed by measurement of n-butyl acetoacetate by gas chromatography vs. an internal standard (see Example 10), and/or by proton NMR.

Examples 10-13 provide crosslinkable enamel formulations prepared from cellulose acetoacetate polymer. The CAA materials are treated with a methylated melamine resin (hexamethoxymelamine) for baking systems (Examples 10 and 12) and with amine-functional polyethers to effect room temperature enamine cure (Examples 11 and 13). Properties of these novel systems are given in Table 1.

Example 1

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Natchez HVX (hardwood cellulose pulp, available from International Paper in Natchez, Mississippi) |
| Weight (g) | 8.00 |
| Solvent (DMAC) | N,N-Dimethylacetamide |
| Volume (mL) | 1275 |
| LiCl Weight (g) | 120 |
| Addition Temperature | 110° C. |
| Acetoacetylation Reagent (tBAA) | tert-Butyl Acetoacetate |
| Weight (g) | 140.52 |
| Addition Time (h) | 4 |
| Hold Time (h) | 2 |
| CAA Yield | 67.70 g, 97.9 percent of theory |
| Key Analyses | Degree of substitution (DS) 0.85, IV (DMSO) 2.05, $M_n$ 91,000, $M_w$ 265,000, $M_z$ 627,000, solubility in $H_2O$ >10 percent |

This example differs from the standard procedure in that a 3 L flask was used.

This example demonstrates that acetoacetylation of cellulose in solution in LiCl/DMAC, using tBAA, can afford water-soluble CAA.

Example 2

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Microcrystalline Cellulose (Avicel PH-105) |
| Weight (g) | 40 |
| Solvent (NMP) | 1-Methyl-2-pyrrolidinone |
| Volume (mL) | 975 |
| LiCl Weight (g) | 100 |
| Addition Temperature | 110° C. |
| Acetoacetylation Reagent | tBAA |
| Weight (g) | 117.1 |
| Addition Time (h) | 1 |
| Hold Time (h) | 3 |
| CAA Yield | 48.02 g, 84.8 percent of theory |
| Key Analyses | DS 0.80, IV (DMSO) 1.10, $M_n$ 45,000, $M_w$ 132,000, $M_z$ 392,000, water solubility >20 percent |

This example demonstrates that microcrystalline cellulose is a suitable substrate for the reaction, that it affords highly water-soluble CAA under the proper conditions, and that LiCl/NMP is a suitable solvent for the reaction.

Example 3

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Natchez HVX |
| Weight (g) | 8.00 |
| Solvent | NMP |
| Volume (mL) | 195 |
| LiCl Weight (g) | 20 |
| Addition Temperature | 110° C. |
| Acetoacetylation Reagent | Diketene |
| Weight (g) | 12.44 |
| Addition Time (h) | 1.5 |
| Hold Time (h) | 0.75 |
| CAA Yield | 7.74 g, 53.3 percent of theory |
| Key Analyses | DS 1.57, $M_n$ 62,000, $M_w$ 282,000, $M_z$ 777,000, insoluble in water, soluble in DMSO or DMF |

This example demonstrates that diketene is a suitable reagent for the solution acetoacetylation of cellulose and that higher DS, water-insoluble materials are available by proper variation of this technique.

Example 4

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Natchez HVX |
| Weight (g) | 8 |
| Solvent | DMAC |
| Volume (mL) | 187 |
| LiCl Weight (g) | 20 |
| Addition Temperature | 30–35° C. |
| Acetoacetylation Reagent | Diketene |
| Weight (g) | 12.44 |
| Addition Time (h) | 1.25 |
| Hold Time (h) | 62 |
| CAA Yield | 12.32 g, 98.7 percent of theory |
| Key Analyses | DS 1.08, insoluble in water, soluble in DMSO or DMF |

This example differs from the standard procedure in that 3 mL of pyridine was added prior to diketene addition (but subsequent to cellulose dissolution) as an acylation catalyst.

This example demonstrates that acetoacetylation can be carried out at near-ambient temperature if a pyridine catalyst is employed.

Example 5

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Natchez HVX |
| Weight (g) | 48 |
| Solvent | DMAC |
| Volume (mL) | 1275 |
| LiCl Weight (g) | 120 |
| Addition Temperature | 110° C. |
| Acetoacetylation Reagent | tBAA |
| Weight (g) | 140.52 |
| Addition Time (h) | 4 |
| Hold Time (h) | 2 |
| CAA Yield | 49.72 g, 83.3 percent of theory |
| Key Analyses | DS 0.47, IV (DMSO) 0.53, $M_n$ 22,000, $M_w$ 53,000, $M_z$ 120,000, water solublity >20 percent |

This example differs from the standard procedure in that after the conclusion of the hold time at 110° C., the solution was heated to 150° C. for 30 minutes with the intention of reducing molecular weight of the polymer. The solution then was cooled to room temperature and the product isolated as in the standard procedure.

This example demonstrates that a high molecular weight cellulose starting material can be used to generate relatively low molecular weight CAA which has very high water solubility, by the simple expedient of a brief period of heating to 150° C. to reduce somewhat the polymer molecular weight.

Example 6

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Natchez HVX |
| Weight (g) | 8 |
| Solvent | NMP |
| Volume (mL) | 187 |
| LiCl Weight (g) | 20 |
| Catalyst | Pyridine |
| Volume (mL) | 1 |
| Addition Temperature | 22–23° C. |
| Acetoacetylation Reagent | Diketene |
| Weight (g) | 16.59 |
| Addition Time (h) | 0.5 |
| Hold Time (h) | 6 |
| Hold Temperature | 22–29° C. |
| CAA Yield | 11.13 g, 91.6 percent of theory |
| Key Analyses | DS 0.96, IV (DMSO) 1.45, $M_n$ 186,000, $M_w$ 623,000, $M_z$ 1,460,000, soluble in NMP, N,N-dimethylformamide and DMSO |

This example differs from the standard procedure in that a catalyst was used (added just before diketene at ambient temperature).

The example demonstrates that, in the presence of pyridine as catalyst, the acetoacetylation proceeds in NMP rapidly even at room temperature.

Example 7

Reagents set forth below were subjected to the standard procedure described above under the indicated reaction conditions. The results, in terms of identity and yield of the desired cellulose acetoacetate, and key analyses of the product, are also set forth below.

| | |
|---|---|
| Starting Cellulose | Natchez HVX |
| Weight (g) | 5.36 |
| Solvent | NMP |
| Volume (mL) | 125 |
| LiCl Weight (g) | 13.4 |
| Catalyst | $H_2SO_4$ |
| Weight (g) | 0.50 |
| Addition Temperature | 24–30° C. |
| Acetoacetylation Reagent | Diketene |
| Weight (g) | 11.1 |
| Addition Time (h) | 0.08 |
| Hold Time (h) | 5 |
| Hold Temperature | 25–30° C. |
| CAA Yield | 7.33 g, 90.0 percent of theory |
| Key Analyses | DS 0.18, swells in water, DMF, and DMSO |

This example differs from the standard procedure in that a catalyst was used (added just before diketene at ambient temperature). Also, excess sodium bicarbonate was added at the end of the hold time to neutralize the catalyst.

The example demonstrates that, in the presence of sulfuric acid as catalyst, the acetoacetylation proceeds even at room temperature.

Example 8

Reagents set forth below were subjected to the standard procedure described above under the indicated reaction conditions. The results, in terms of identity and yield of the desired cellulose acetoacetate, and key analyses of the product, are also set forth below.

| Starting Cellulose | Natchez HVX |
|---|---|
| Weight (g) | 5.68 |
| Solvent | NMP |
| Volume (mL) | 133 |
| LiCl Weight (g) | 14.2 |
| Catalyst | Sodium Acetate |
| Weight (g) | 0.80 |
| Addition Temperature | 60–70° C. |
| Acetoacetylation Reagent | Diketene |
| Weight (g) | 11.8 |
| Addition Time (h) | 0.33 |
| Hold Time (h) | 2.7 |
| Hold Temperature | 60–68° C. |
| CAA Yield | 6.66 g, 101.0 percent of theory |
| Key Analyses | DS 0.31, swells in water, DMSO, and DMF |

This example differs from the standard procedure in that a catalyst was used (added just before diketene at ambient temperature).

The example demonstrates that, in the presence of sodium acetate as catalyst, the acetoacetylation proceeds rapidly even at 60°–70° C.

Example 9

Reagents set forth below were subjected to the standard procedure described above under the indicated reaction conditions. The results, in terms of identity and yield of the desired cellulose acetoacetate, and key analyses of the product, are also set forth below.

| Starting Cellulose | Natchez HVX |
|---|---|
| Weight (g) | 8.00 |
| Solvent | NMP |
| Volume (mL) | 187 |
| LiCl Weight (g) | 20.0 |
| Catalyst | None |
| Addition Temperature | 24–25° C. |
| Acetoacetylation Reagent | Diketene |
| Weight (g) | 16.6 |
| Addition Time (h) | 0.08 |
| Hold Time (h) | 25 |
| Hold Temperature | 24–28° C. |
| CAA Yield | 14.79 g |
| Key Analyses | DS 0.80, soluble in DMF, highly swollen in DMSO |

This example demonstrates that, even without an added catalyst, the acetoacetylation proceeds slowly at room temperature, suggesting that lithium chloride is itself a catalyst for the reaction.

Example 10

The water soluble cellulose acetoacetate of Example 1 (100 g) was dissolved in water (1200 g) to give a clear solution having a Brookfield viscosity of 470 cP. DuPont's R900 futile titanium dioxide (100 g) was added and dispersed in an IKA Ultra Turrax T50 disperser to a Hegman Fineness or dispersion value of 7. This product, referred to as "Grind A" was used to make the following fully formulated melamine crosslinked enamel:

| Ingredient | Liquid | Solid |
|---|---|---|
| Grind A | 100.0 g | |
| CAA | | 7.7 g |

-continued

| Ingredient | Liquid | Solid |
|---|---|---|
| TiO$_2$ | | 7.7 g |
| Cyanamid's Cymel 303 | 3.3 g | 3.3 g |
| p-Toluenesulfonic acid, 40 percent | .14 g | .06 g |
| 3M Company FC430 Flow Aid, 20 percent | .10 g | .02 g |
| Pigment/Binder: | 41.2/58.8 | |
| Resin/Crosslinker: | 70/30 | |
| Solvent: | Water | |
| Percent Solids: | 18.0 | |

This white industrial baking enamel was applied to 20 gauge iron phosphate pre-treated steel test panels, cured at 150° C. for 30 minutes to a dry film thickness of 0.25 mils and subjected to the tests shown in Table 1 below.

Example 11

The cellulose acetoacetate/TiO$_2$ dispersion, Grind A, of Example 10 was used to prepare the following low-temperature-cure enamine crosslinked enamel formulation:

| Ingredient | Liquid | Solid |
|---|---|---|
| Grind A | 100.0 g | |
| CAA | | 7.7 g |
| TiO$_2$ | | 7.7 g |
| Texaco's Jeffamine D230 | 2.3 g | 2.3 g |
| Pigment/Binder: | 43.5/56.5 | |
| Resin/Crosslinker: | 77/23 | |
| Solvent: | Water | |
| Percent Solids: | 17.3 | |

This coating was applied to 20 gauge iron phosphate pre-treated steel test panels, force-dried at 60° C. for one hour, ambient cured for an additional 23 hours at room temperature, then subjected to the tests shown in Table 1 below.

Example 12

The water soluble cellulose acetoacetate of Example 2 (100 g) was dissolved in water (1000 g) to give a clear solution having a Brookfield viscosity of 60 cP. DuPont's R900 rutile titanium dioxide (100 g) was added and dispersed in a IKA Ultra Turrax T50 disperser to a Hegman Fineness or dispersion value of 7. This product, referred to as "Grind B", was used to make the following fully formulated melamine crosslinked enamel:

| Ingredient | Liquid | Solid |
|---|---|---|
| Grind B | 100.0 g | |
| CAA | | 9.1 g |
| TiO$_2$ | | 9.1 g |
| Cyanamid's Cymel 303 | 3.9 g | 3.9 g |
| p-Toluenesulfonic acid, 40 percent | .16 g | .06 g |
| 3M Company FC430 Flow Aid, 20 percent | .12 g | .02 g |
| Pigment/Binder: | 41.2/58.8 | |
| Resin/Crosslinker: | 70/30 | |
| Solvent: | Water | |
| Percent Solids: | 21.3 | |

This white industrial baking enamel was applied to 20 gauge iron phosphate pre-treated steel test panels, cured at 150° C. for 10 minutes to a dry film thickness of 0.25 mils and subjected to the tests shown in Table 1 below.

the degree of substitution. This analysis has been confirmed by proton nuclear magnetic resonance spectroscopy.

TABLE 1

| Property | Performance of Cellulose Acetoacetate-Based Coatings | | | |
|---|---|---|---|---|
| | Example 10 | Example 11 | Example 12 | Example 13 |
| Cured Film Thickness | .22 mils | .24 mils | .27 mils | .21 mils |
| Specular Gloss, 60°/20° | 20/4 | 7/2 | 25/6 | 7/2 |
| Pencil Hardness | 9H | 9H | 5H | 9H |
| Solvent Resistance, MEK, rubs | 200 | 200 | 200 | 200 |
| Iodine Stain Resistance, 5 minutes (1–5, 5 best) | 4 | 3 | 4 | 2 |
| Direct Impact Resistance, in lbs. | 40 | 60 | 10 | 40 |
| Humidity Resistance | | | | |
| Blisters | None | Not Recommended | None | Not Recommended |
| Gloss Retention, percent | 90 | | 90 | |

Example 13

The cellulose acetoacetate/TiO$_2$ dispersion, Grind B, of Example 12 was used to prepare the following low-temperature-cure enamine crosslinked white enamel formulation containing phosphoric acid to aid adhesion to steel:

| Ingredient | Liquid | Solid |
|---|---|---|
| Grind B | 100.0 g | |
| CAA | | 9.1 g |
| TiO$_2$ | | 9.1 g |
| Texaco's Jeffamine D230 | 2.7 g | 2.7 g |
| Phosphoric Acid | 0.05 g | |
| Pigment/Binder: | | 43.5/56.5 |
| Resin/Crosslinker: | | 77/23 |
| Solvent: | | Water |
| Percent Solids: | | 20.3 |

This coating was applied to 20 gauge iron phosphate pre-treated steel test panels, force-dried at 60° C. for one hour, ambient cured for an additional 23 hours at room temperature, then subjected to the tests shown in Table 1 below.

Example 14

Cellulose acetoacetate samples were analyzed by taking advantage of the fact that, at high temperature, they thermally decompose into cellulose and acetylketene at a moderate rate. Trapping of the acetylketene by a primary alcohol which will afford a volatile acetoacetate ester permits analysis of the produced ester by gas chromatography (GC).

A sample of the ester from Example 1 (about 0.3000 g) was weighed into a 120 mL microwave vessel. Five mL of internal standard solution (1 mL of 1-methylnaphthalene in 250 mL n-butanol) was added to the vessel, then 30 mL n-butanol was added. A total of 5 such vessels (if less than 5 samples were being analyzed, the remaining vessels were charged with 35 mL n-butanol blanks) were placed in a rotating turntable in an industrial microwave oven (CEM MDS-81D). The oven was set to 55 percent power and turned on for 60 minutes with the turntable rotating. In another experiment with an equal volume of neat n-butanol in each vessel it was found that the temperature in each vessel stabilized at 160° C. At the end of this time the samples were cooled to room temperature and the supernatant liquid was analyzed by GC. Standard GC techniques permitted determination of the weight of n-butyl acetoacetate generated per gram of sample. This allowed simple calculation of the moles of acetoacetyl per gram of sample, thus the weight percent acetoacetyl, and thus The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claims:

1. A coating composition comprising:
   (A) about 0.5 to about 50 percent, based on the weight of the total coating composition, of a water soluble cellulose acetoacetate having a DS/AGU of 0.01 to about 1.9,
   (B) about 25 to about 95 percent, based on the weight of the total coating composition, of water, and
   (C) about 0 to about 40 percent, based on the weight of the cellulose acetoacetate, of a crosslinking agent.

2. The coating composition of claim 1 wherein the amount of component (A) is about 2.5 to about 30 percent, the amount of component (B) is about 30 to about 80 percent, and the amount of component (C) is about 1 to about 35 percent.

3. The coating composition of claim 1 wherein the amount of component (A) is about 5 to about 25 percent, the amount of component (B) is about 40 to about 60 percent, and the amount of component (C) is about 2 to about 25 percent.

4. The coating composition of claim 3 wherein the amount of component (C) is about 3 to about 18 percent.

5. The coating composition of claim 1 wherein said crosslinking agent is present in an amount of about 0.5 to about 40 percent and is a melamine resin, a urea resin, an amine-containing resin or a mixture thereof.

6. The coating composition of claim 1 wherein said crosslinking agent is hexamethoxymethylmelamine, hexabutoxymethylmelamine, tetramethoxymethylurea, tetrapropoxymethylurea, an amine terminated polyamide, an amine terminated polyoxyethylene, an amine terminated polyoxypropylene, or a mixture thereof.

7. The coating composition of claim 1 additionally containing up to about 70 percent, based on the weight of the cellulose acetoacetate, of at least one additional coating additive.

8. The coating composition of claim 1 additionally containing about 1 to about 30 percent, based on the weight of the cellulose acetoacetate, of at least one additional coating additive.

9. The coating composition of claim 8 wherein said additional coating additive is a flow control additive, a coalescing solvent, a strong acid, a pigment, a dye, a biocide, or a thickener.

10. The coating composition of claim 9 wherein said flow control additive is a silicone, a fluorocarbon, or a different cellulose ester; said coalescing solvent is diethylene glycol monobutyl ether, trimethylpentanediol monoisobutyrate, or ethylene glycol monooctyl ether; said strong acid catalyst is p-toluenesulfonic acid, trichloroacetic acid, or trifluoromethanesulfonic acid; said pigment is titanium dioxide, a baryte, a clay, or calcium carbonate; said dye is phthalocyanine blue, molybdate orange or carbon black; said biocide is a tin compound, a quaternary ammonium compound, or an iodine compound; and said thickener is carboxy-methyl cellulose, hydroxypropyl methyl cellulose, ethyl hydroxyethyl cellulose, or guar gum.

11. The coating composition of claim 1 having a Gardner-Holdt viscosity of about T to about Z3.

12. The coating composition of claim 10 having a Gardner-Holdt viscosity of about W to about Z1.

13. A process for preparing a coated substrate comprising contacting said substrate with a coating composition comprising:
(A) about 0.5 to about 50 percent, based on the weight of the total coating composition, of water soluble cellulose acetoacetate having a DS/AGU of 0.01 to about 1.9,
(B) about 25 to about 95 percent, based on the weight of the total coating composition, of water, and
(C) about 0 to about 40 percent, based on the weight of the cellulose acetoacetate, of a crosslinking agent,
followed by removing water and thermal curing.

14. A coated substrate comprising a substrate having coated thereon a cured water soluble cellulose acetoacetate.

15. The coated substrate of claim 14 wherein said substrate is paper, a polymer film, a metal, glass, or a urethane elastomer.

16. The coated substrate of claim 15 wherein the substrate is primed.

17. The coated substrate of claim 14 having a pencil hardness of about B to about 4H, a gloss at 60° C. of about 40 percent to about 100 percent, a solvent rub resistance of at least about 200, a humidity resistance at 60° C. for 100 hours of about 70 percent to 100 percent gloss retention.

18. The coated substrate of claim 14 having a pencil hardness of at least F, a gloss at 60° C. of about 60 percent to about 100 percent, a solvent rub resistance of at least about 250, a humidity resistance at 60° C. for 100 hours of about 88 percent to about 100 percent gloss retention.

* * * * *